(12) United States Patent
Sumenkov et al.

(10) Patent No.: US 11,403,398 B2
(45) Date of Patent: Aug. 2, 2022

(54) SYSTEM AND METHOD OF DETECTING A SOURCE OF MALICIOUS ACTIVITY IN A COMPUTER SYSTEM

(71) Applicant: AO Kaspersky Lab, Moscow (RU)

(72) Inventors: Igor I. Sumenkov, Moscow (RU); Sergey Y. Golovanov, Moscow (RU)

(73) Assignee: AO Kaspersky Lab, Moscow (RU)

(*) Notice: Subject to any disclaimer, the term of this patent is extended or adjusted under 35 U.S.C. 154(b) by 448 days.

(21) Appl. No.: 16/420,409

(22) Filed: May 23, 2019

(65) Prior Publication Data
US 2020/0210578 A1 Jul. 2, 2020

(30) Foreign Application Priority Data
Dec. 28, 2018 (RU) .............................. RU2018147236

(51) Int. Cl.
G06F 21/56 (2013.01)
G06N 7/00 (2006.01)
G06F 16/901 (2019.01)

(52) U.S. Cl.
CPC ........ G06F 21/566 (2013.01); G06F 16/9024 (2019.01); G06N 7/005 (2013.01); *G06F 2221/034* (2013.01)

(58) Field of Classification Search
CPC .... G06F 21/562; G06F 21/566; G06F 21/552; G06F 16/9024; G06F 2221/034; G06N 5/003
See application file for complete search history.

(56) References Cited

U.S. PATENT DOCUMENTS 7,624,448 B2  11/2009 Coffman
8,225,041 B2   7/2012 Fujita et al.
(Continued)

FOREIGN PATENT DOCUMENTS

| JP | 2016206943 A | 12/2016 |
|---|---|---|
| RU | 2654151 C1 | 5/2018 |
| WO | 2017180666 A | 10/2017 |

OTHER PUBLICATIONS

Bindu, Graph Feature Based Multi-Layer Social Network Analysis for Anomaly Detection, Mar. 2018, Mangalore—575 025. (Year: 2018).*

(Continued)

*Primary Examiner* — Matthew Smithers
*Assistant Examiner* — Shu Chun Gao
(74) *Attorney, Agent, or Firm* — ArentFox Schiff LLP; Michael Fainberg

(57) ABSTRACT

Disclosed herein are methods and systems for detecting a source of malicious activity in a computer system. An exemplary method comprises gathering information related to the objects of the computer system, forming a graph based on the information gathered on the objects, selecting at least two induced subgraphs (hereinafter, subgraph) from the resulting graph, determining the coefficient of harmfulness for each selected subgraph, the coefficient of harmfulness representing a numerical characteristic describing the strength of the relations between the vertices of that subgraph, determining, from the selected subgraphs, a subgraph whose coefficient of harmfulness is a minimum among the determined coefficients of harmfulness of the subgraphs, and the total coefficient of harmfulness of the subgraphs related to that subgraph is a maximum, identifying the object correlated with at least one vertex of the determined sub- (Continued)

graph as a source of the malicious activity in the computer system.

20 Claims, 6 Drawing Sheets

(56) References Cited

U.S. PATENT DOCUMENTS

| | | |
|---|---|---|
| 8,931,092 B2 | 1/2015 | Wyschogrod |
| 9,336,388 B2 | 5/2016 | Brdiczka |
| 2007/0209074 A1 | 9/2007 | Coffman |
| 2008/0178293 A1 | 7/2008 | Keen et al. |
| 2016/0364794 A1* | 12/2016 | Chari ................ G06Q 40/02 |
| 2018/0276380 A1 | 9/2018 | Ladnai et al. |
| 2018/0329958 A1* | 11/2018 | Choudhury ........ G06F 16/2343 |
| 2020/0177616 A1* | 6/2020 | Hadar ................ H04L 63/1433 |

OTHER PUBLICATIONS

AlEroud et al., Queryable Semantics to Detect Cyber-Attacks: A Flow-Based Detection Approach, IEEE, Feb. 2018 (Year: 2018).*

* cited by examiner

SYSTEM AND METHOD OF DETECTING A SOURCE OF MALICIOUS ACTIVITY IN A COMPUTER SYSTEM

CROSS-REFERENCE TO RELATED APPLICATIONS

This application claims benefit of priority under 35 U.S.C. 119(a)-(d) to Russian Application No. 2018147236 filed on Dec. 28, 2018, the contents of which are incorporated in their entirety herein.

FIELD OF TECHNOLOGY

The present disclosure relates to technologies for providing information security, and more specifically to systems and methods of detecting a source of malicious activity in a computer system.

BACKGROUND

The rapid growth of computer technologies in the recent decade, and also the widespread use of various computing devices (personal computers, notebooks, tablets, smartphones, and so on), has become a powerful stimulus to the use of those devices in diverse areas of activity and for a large number of tasks (from Internet surfing to bank transfers and electronic document traffic). In parallel with the growth in computing devices and the volume of software running on these devices, the number of malicious programs has also grown at a rapid pace.

A large number of varieties of malicious programs exist at present. Some malicious programs steal personal and confidential data from the devices of users (such as logins and passwords, bank details, electronic documents). Other malicious programs form so-called botnets from the devices of users for attacks such as a DDoS (Distributed Denial of Service) or for sorting through passwords by the method of brute force against other computers or computer networks. Still other malicious programs propose paid content to users through intrusive advertising, paid subscriptions, sending of SMS to toll numbers, and so forth.

Special programs known as antivirus deal quite well with the above-described threats. However, in certain situations said antivirus is practically useless, for example, in targeted cyber-attacks on computer systems (APT—advanced persistent threat), and also when said antivirus is not working on the computer systems when they become infected (for example, the antivirus was not installed or has been turned off).

In this case, in order to ascertain that a computer system is infected, it is necessary to carry out a resource-hungry analysis of the condition of the computer system and analyze the behavior logs of the computer system, the data being received and sent in the computer network, the actions of the users, and so forth. Oftentimes the described measures need to be performed manually, which although increasing their effectiveness significantly increases the labor expense.

The known technologies handle the tasks of recovering and linking up disparate data gathered in computer systems, but they do not handle the tasks of analysis of the condition of a computer system on the basis of identified relations of that data, on the basis of which the condition in which the computer system being analyzed found itself at a given time or the actions carried out on the computer system at a given time can be analyzed afterwards and the cause of the occurrence of a particular condition of the analyzed computer system or an action performed on the computer system can be determined.

The present disclosure makes it possible to solve the problem of detecting the source of malicious activity on a computer system more effectively.

SUMMARY

The present disclosure is designed to provide informational security of data.

The technical result of the present disclosure is to detect a source of malicious activity in a computer system on the basis of an analysis of the relations among objects of that computer system.

In some aspects, these results are achieved with the use of a method of detecting a source of malicious activity in a computer system, wherein the method is realized with the aid of components of the system of detecting a source of malicious activity in a computer system and comprises steps in which information is gathered as to the objects of the computer system (hereinafter, "objects"); a graph is formed on the basis of the information gathered on the objects, where the objects appear as the vertices of the graph, and the relations between objects as determined on the basis of the analysis of the gathered information appear as the edges of the graph; at least two induced subgraphs (hereinafter, subgraph) are selected from the resulting graph; the coefficient of harmfulness is determined for each selected subgraph, the coefficient of harmfulness representing a numerical characteristic describing the strength of the relations between the vertices of that subgraph; from the selected subgraphs, that subgraph is determined whose coefficient of harmfulness is a minimum among the determined coefficients of harmfulness of the subgraphs, and the total coefficient of harmfulness of the subgraphs related to that subgraph is a maximum; the object correlated with at least one vertex of the determined subgraph is found to be the source of the malicious activity in the computer system.

In another particular aspect of the method, the coefficient of harmfulness of the subgraph is determined on the basis of the degree of similarity of that subgraph with at least one subgraph from a database of graphs containing previously formed graphs of malicious activity of the computer system, each of which is associated with a coefficient of harmfulness.

In yet another particular aspect of the method, the coefficient of harmfulness of a subgraph is a coefficient of harmfulness characterizing the probability that at least one object of those associated with the vertices of the mentioned subgraph is malicious.

In another particular aspect of the method, only subgraphs related to other subgraphs by graph edges associated with a cause and effect relationship are analyzed.

In yet another particular aspect of the method, the subgraphs whose diameters are less than a predetermined threshold value are analyzed.

In another particular aspect of the method, previously unknown objects are selected from the objects found as being the source of the malicious activity.

The present disclosure also provides a system for detecting a source for malicious activity. In one aspect, the system comprises a hardware processor configured to: gather information related to the objects of the computer system; form a graph on the basis of the information gathered on the objects, where the objects appear as the vertices of the graph, and the relations between objects as determined on the basis of the analysis of the gathered information appear as the edges of the graph; select at least two induced subgraphs (hereinafter, subgraph) from the resulting graph; determine the coefficient of harmfulness for each selected subgraph, the coefficient of harmfulness representing a numerical characteristic describing the strength of the relations between the vertices of that subgraph; determine, from the selected subgraphs, a subgraph whose coefficient of harmfulness is a minimum among the determined coefficients of harmfulness of the subgraphs, and the total coefficient of harmfulness of the subgraphs related to that subgraph is a maximum; identify the object correlated with at least one vertex of the determined subgraph as a source of the malicious activity in the computer system.

The present disclosure further provides a computer readable medium storing instructions thereon for executing the methods described above.

The above simplified summary of example aspects of the disclosure serves to provide a basic understanding of the disclosure. This summary is not an extensive overview of all contemplated aspects, and is intended to neither identify key or critical elements of all aspects nor delineate the scope of any or all aspects of the disclosure. To the accomplishment of the foregoing, the one or more aspects of the disclosure include the features described and particularly pointed out in the claims.

BRIEF DESCRIPTION OF DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for protecting files stored in a network file system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following definitions and concepts are used in describing variant aspects of the present disclosure.

A functional relation is a type of relation (link) between objects whereby changes in each of the objects correspond to each other. In a functional relation, the primary attributes of a causal relationship are absent: productivity (the objects do not produce each other), asymmetry in time (they coexist, one of them does not precede the other), and irreversibility.

Figure 1:
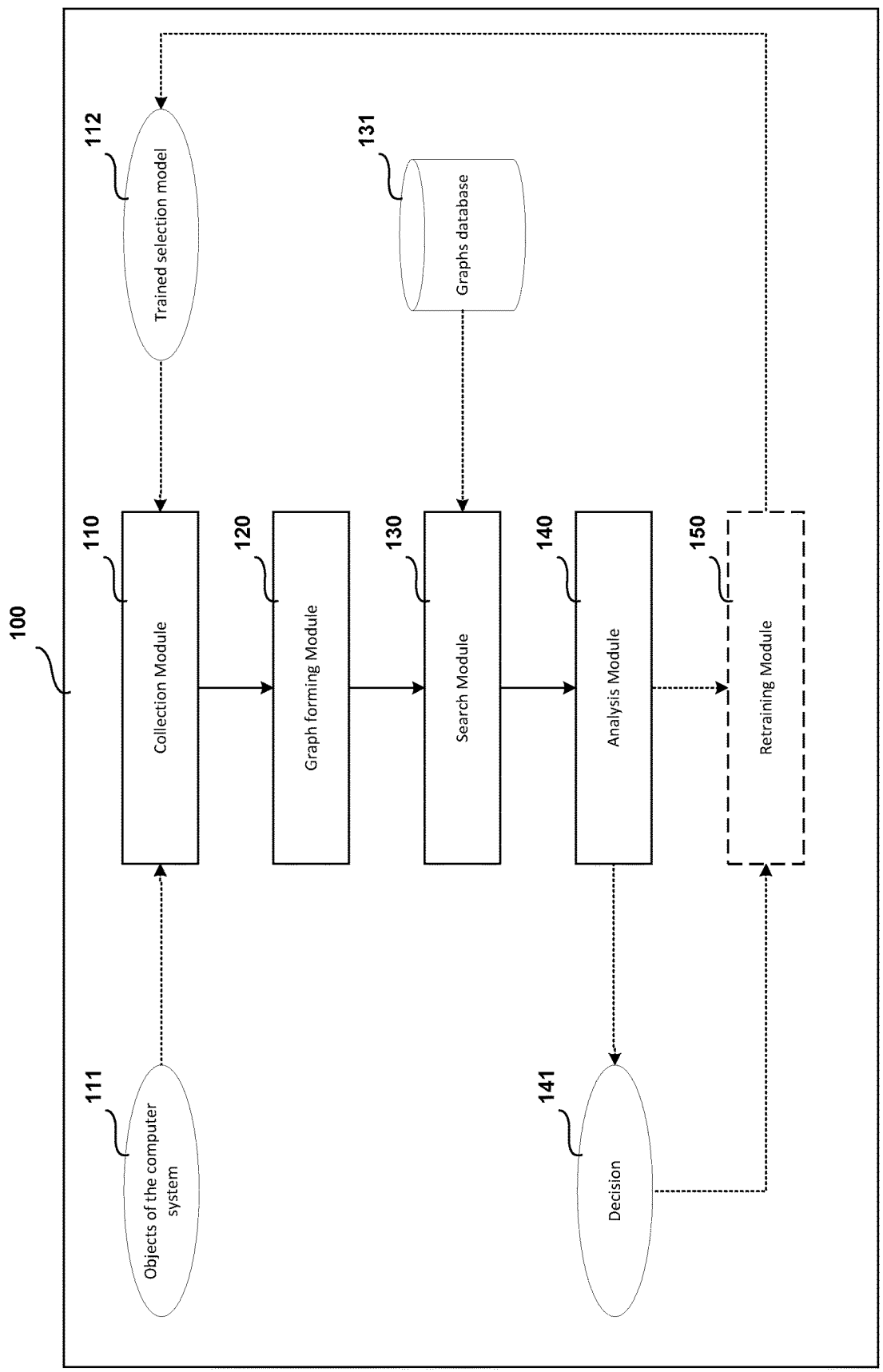
FIG. 1 illustrates a system of detecting malicious activity in a computer system in accordance with exemplary aspects of the present disclosure.

FIG. 1 illustrates a block diagram of the system of detecting malicious activity in a computer system in accordance with exemplary aspects of the present disclosure.

The system 100 of detecting malicious activity in a computer system contains a collection module 110, objects of the computer system 111, a trained selection model 112, a graph forming module 120, a graphs database 131, a search module 130, an analysis module 140, a decision 141, and a retraining module 150.

In one aspect, the collection module 110 may:

gather information about the objects of the computer system 111 (hereinafter, "information about the objects" and "objects", respectively);

determine the relation among the objects 111 on the basis of an analysis of the gathered information, where each relation is assigned a degree of reliability of the relation;

send the information about the gathered objects 111 and the determined relations to the graph forming module 120.

For example, the gathering of information about the objects of the computer system 111 by the collection module 110 may be done with the aid of a specialized driver installed in the computer system, which intercepts the data being transferred between processes, in the network, and so forth.

In one variant aspect of the system, the objects 111 may comprise at least:

files;

network packets;

sites;

RAM pages, both physical and virtual;

processes and other objects of the operating system related to them;

events of the operating system;

entries written in logs of the operating system or applications;

entries written in the MFT (master file table);

entries written in the operating system registry.

For example, object 111 may constitute a web site address, such as "http://google.com" or "http://files.downloads.com/chrome.exe".

In yet another example, the operating system log "system.evtx" consists of entries 111, one example of which is presented below:

Record #299185 2017.10.26-17:29:18 'Computer':'DC3.hq.msk',
'Channel':'System',
'EventSourceName':'Service Control Manager',

```
'Guid':'{555908d1-a6d7-4695-8e1e-26931d2012f4}',
'Name':'Service Control Manager',
'xmlns':'http://schemas.microsoft.com/win/2004/08/events/event',
'Level':04,
'Opcode':00,
'Task':0000,
'EventID':7036 (The service entered the new state.),
'Qualifiers':16384,
'Keywords':8080000000000000,
'SystemTime':2017.11.25-18:29:18,
'ProcessID':00000524,
'ThreadID':00003420,
'EventRecordID':0000000000299185,
'Version':00, 'param1':'WinHTTP Web Proxy Auto-Discovery Service',
'param2':'running',
'Binary':570069006E0048007400740070004100750074006F00500072006F
0078007900530076006300 2F0034000000,
``` containing a set of "key"-"value" pairs describing a system event.

In yet another variant aspect of the system, the information about the objects 111 comprise at least:
uniquely characterizing that object 111,
making it possible to conclude as to the existence of a relation between that object 111 and another object 111.

For example, if there is a file #1 and a file #2 both having been extracted from an archive #3, then these files are characterized by a size, and also characterized by their time of creation (essentially the time of being extracted from the archive). While the size of the files contains practically no information as to whether the files #1 and #2 are related to each other, the time of creation of these files may indirectly indicate that the files were extracted from an archive (for example, if the times of creation of files #1 and #2 coincide with a given accuracy).

In yet another example, data from the operating system log containing information about the creation of the files, i.e., which process created the file, when and with what name, might indicate a direct relation between file #1 and file #2, for example, when a process #4 launched from file #1 created file #2.

In yet another variant aspect of the system, the information about the objects 111 comprises at least:
information about files:
  file name,
  path to the file,
  file size;
information about processes:
  process identifier,
  identifiers of parent and child processes;
  name of the file from which the process was launched;
information about network packets:
  address of reception or sending of a network packet,
  size of the network packet,
  type, size and "convolution of data" contained in the network packet,
  name of the application receiving or sending the network packet;
RAM pages:
  type, size, flags of RAM pages,
  size, position, type and "convolution of data" in RAM pages,
  identifiers of processes and names of applications working with data on specified RAM pages;
entries in operating system logs:
  key-value, where the key is the name of a parameter, and the value is its value.

For example, in the operating system registry (which may be viewed as one of the logs of the operating system) the following entry may appear:
  ImagePath    REG_EXPAND_SZ% systemroot%\KtknjRrl.exe The key in this example is the name of the field "ImagePath", and the value of the key is the pair of values "field type", or "REG_EXPAND_SZ %", and "field value", or "systemroot %\KtknjRrl.exe".

The convolution of data (hash sum) is the result of a processing of data with the aid of a hash function, wherein any given set of data is associated with another set of data of smaller size. In a particular instance, the convolution of data is the check sum of the data (such as CRC32 or MD5).

In yet another variant aspect of the system, the relation among objects 111 is a logical or functional relation (for example, one in the form of a binary relation) between those objects 111, wherein a logical relation may arise when two objects 111 are used jointly (i.e., when the objects 111 are used as related objects or at related times, especially at the same time), while they might not be related to each other (for example, a network packet and an event of the operating system "write file to disk"); a functional relation might arise when one object 111 is used to analyze another object 111 (for example, sites and network packets).

In yet another variant aspect of the system, a relation (both functional and logical) is established between two objects 111 when a condition is fulfilled, whereby at least:
  a first object processes data provided by a second object;
for example, the use of the inter-process communication (IPC) technology, in one instance of which a first process reads data from the memory of a second process;
  a first object uses a second object;
for example, the use of a dynamically linked library (DLL) by a program for its working;
  the first and second objects are used by a third object;
for example, the using of two independent DLLs by a program in its working (i.e., DLLs, the functions of one of which do not use the functions of the other);
  said objects have at least one identical parameter characterizing them;
for example, the parameter might be the file name.

The above example described in further detail will appear as follows: upon creating the service, there is performed:
writing of the file "KtknjRrl.exe" to hard disk, information about is written into the MFT:
inode 3751 MACB Sept. 3, 2016 18:42:05 Size 56320
writing of data about the operation performed in the event log:

---
09.03.2016 22:42:05 -
Service Name: ffKu
Service File Name: %systemroot%\KtknjRrl.exe Service Type: user mode
service Service Start Type: auto start Service Account: LocalSystem

--- writing of data about the service created to the registry:

---
HKLM\SYSTEM\ControlSet001\services\ffKu
Type            REG_DWORD           0x00000010
Start           REG_DWORD           0x00000002
ErrorControl    REG_DWORD           0x00000000
ImagePath       REG_EXPAND_SZ% systemroot%\KtknjRrl.exe
DisplayName     REG_SZ              ffKu
ObjectName      REG_SZ              LocalSystem
HKLM\System\ControlSet001\Control\Sessiona
Manger\AppCompatCache\AppCompatCache

---

All three entries are united by the file name "KtknjRrl.exe", appearing as a common parameter for the MFT (by the ID corresponding to the file "KtknjRrl.exe"), the event log, and the registry.

In yet another example, with the aid of the browser "chrome.exe" the user has downloaded from the site "http://files.com" an archive "drivers.zip", from which with the aid of the application "WinZip" he then extracted the file "driver.sys". In this case, it will be established that the file "driver.sys" is directly related to the file "drivers.zip" and indirectly to the browser "chrome.exe". The objects 111 in this example will be the object #1: the browser "chrome.exe", object #2: the archive "drivers.zip", object #3: the file "driver.sys", and object #4: the site "http://files.com".

A direct relation between the objects #1 and #2 is established when changes in object #1 or in the behavior of object #1 influence object #2 or the behavior of object #2 (for example, object #1 is an archive and object #2 is a file extracted from the archive), and an indirect relation between object #1 and object #2 is established when between a direct relation exists between object #1 and object #3, object #2 and object #3 (for example, an indirect relation is established between two files extracted from an archive). It is possible to establish both a direct and an indirect relation between objects at the same time.

In general, the following relations may be identified in the above-described example:

---
"driver.sys"    →    "driver.zip"
"driver.sys"    →    "http://files.com"
"driver.sys"    →    "chrome.exe"
"drivers.zip"   →    "http://files.com"
"drivers.zip"   →    "chrome.exe"
"http://files.com" →  "chrome.exe"

---

In yet another example demonstrating the relations between the objects 111, various services of the Windows operating system write data about their working to the operating system log "system.evtx" in the format "[id of entry] [time] [process] [event] [parameters]". For example, the log contains the following entries:

---
1252, "1527076481", "explorer.exe", "write file", "data.dat"
...
1261, "1527076516", "hsayy.exe", "read file", "data.dat"

---

In this case, it will be established that the process "hsayy.exe" is related to the process "explorer.exe", since a previously established condition relating two different objects 111 has been fulfilled: the file identical file "data.dat" has been written and read with a difference of 30 seconds.

In yet another variant aspect of the system, the degree of reliability of a relation between two objects 111 is a numerical value characterizing the probability that one of those objects 111 has a logical or functional relation to another of those objects 111.

For example, the degree of reliability of the relation may be a real numerical value in the range of 0.0 to 1.0, where the value 0.0 means that the objects 111 are definitely not related to each other, while 1.0 means that a relation assuredly exists between those objects 111.

Thus, in the case when the degree of reliability of a relation between objects 111 is not the maximum possible one (for example, 1.0 from the above-described example), the determination of a relation between the objects 111 is probabilistic in nature and oftentimes the relation is not determined strictly, but on the basis of past experience, statistical data on the relation between those objects 111.

For example, the fact that two objects 111 created with a difference of 0.1 seconds are related to each other (for example, they were created upon installing software) is a supposition, yet with a high degree of reliability on account of the enormous volume of cumulative statistical data about the working of an operating system and the installing of various software.

In yet another variant aspect of the system, the sending of information about the gathered objects 111 and the relations found to the graph forming module 120 is done only if the degree of reliability of the relation found between the gathered objects 111 exceeds a previously established threshold value.

For example, the degree of reliability of a relation may be calculated as follows: Each of the objects #1 and #2 111 between which a relation is being established is described by a set of parameters $\{p_i\}$ and $\{q_j\}$ characterizing those objects 111.

In yet another variant aspect of the system, the selection of objects 111 on which the collection module 110 is gathering information and between which relations are being determined may be done with the use of a trained selection model 112. The trained selection model 112 is formed in advance with the use of the methods of machine learning, which are known in the prior art, on the basis of a training sample, including computer systems whose behavior is known in advance (malicious or secure), such that the number of selectable objects 111 tends to a minimum, while the decision as to the detection of malicious activity pronounced by the analysis module 140 on the basis of an analysis of the information about those objects 111 and the relations between them tends toward a maximum of accuracy. Such an approach makes it possible to reduce the use of computing resources (memory, processor time, and so on) to determine malicious activity in a computer system, while preserving the accuracy of the decision pronounced.

Since both objects 111 (information about the objects) and relations between the objects 111 may be used in the following to determine malicious activity in a computer system, it will be convenient to represent the group of selected objects 111 and the group of relations found between the selected objects 111 as the elements of a graph—a mathematical object for which a broad and multifunctional theory (graph theory) has been developed in the use thereof, and the analysis comes down to the solving of abstract mathematical problems.

A graph is an abstract mathematical object representing an array of graph vertices and graph edges, that is, connections between pairs of vertices. For example, as the array of vertices one may use the array of objects 111, and as the array of edges one may use the array of logical and functional relations between the selected objects 111.

The kinds of graphs for different areas of application may differ in directionality, limitations on the number of relations, and supplemental data on the vertices or edges. Many structures of practical interest in mathematics and computer science may be represented by graphs. For example, a computer system may be modeled with the aid of an oriented graph in which, as mentioned above, the vertices are the objects 111 (to be described by a set of parameters representing information about the objects 111), while the arcs (oriented edges) are the logical and functional relations between those objects 111. Furthermore, each vertex (relation) may be assigned a weight (degree of reliability of the relation) and a weighted oriented graph can be formed.

In one aspect, the graph forming module 120 may:
  form at least two graphs on the basis of information about the relations found, such that the diameter of the graph is less than a previously specified value, the vertices of the graph being the objects 111, while the edges are the relations so determined;
  form a summary graph on the basis of the graphs so formed, such that the summary graph contains at least one vertex from the first and second graph and one edge joining those vertices;
  extract from the graph so formed at least two induced subgraphs (hereinafter, subgraph);
  transfer the summary graph so formed to the search module and the analysis module 140.

For example, if the computer system can be represented as a distributed system of clients, in this case graphs for each of the clients are formed on the basis of the objects 111 gathered from each client and the relations found between those objects 111.

In one variant aspect of the system, the summary graph so formed is optimized in order to reduce the number of edges of the graphs (i.e., the relations between the objects 111).

For example, during the optimization of the graph, there are eliminated from the graph at least:
  vertices with predetermined properties (such as objects of specified types, having specified parameters),
  edges with predetermined properties (for example, relations between objects relating to the time of creation of the objects),
  duplicate edges.

In yet another variant aspect of the system, the number of intersections of the edges of the summary graph are minimized, where the number of intersections of the edges of a graph (the number of intersections of a graph) is the smallest number of elements in the representation of that graph as a graph of intersections of finite sets or, which is the equivalent, the smallest number of clicks needed to cover all edges of the graph.

In yet another variant aspect of the system, the graph forming module 120 may:
  form a graph on the basis of information about the relations found, the vertices of the graph being the objects 111, while the edges are the relations so determined, such that;
    the diameter of the graph is less than a predetermined parameter;
    it contains at least one vertex from the first and second graph and one edge joining those vertices;
  transfer the graph so formed to the search module and the analysis module 140.

In yet another variant aspect of the system, the graph forming module 120 may form several graphs on the basis of several graphs (at least three), yet fewer than the number of those graphs (at least two) of the summary graphs.

For example, during the analysis of a computer system representing a distributed system (for example, personal computers united into a local area network), several graphs are formed for each computer (essentially an independent element of the computer system). Then, on the basis of the graphs formed for each computer, one summary graph is formed for each computer and the entire set of summary graphs so formed is sent to the search module 130.

In yet another example, in the case when the computer system represents a distributed system, a graph is constructed on the basis of information about the objects 111 of that computer system, including the names of the users and their IP addresses contained in the entries of the operating system logs "security.evtx". As a result, the following chain of actions (directional graph) is obtained, for example:
  user #1 created a file on computer #1→. . . . . . →user #1 logged in from computer #2→. . . . . . →on computer #2, user #1 logged out as user #2→. . . . . . →user #2 logged in from computer #3 and so on.

The search module 130 is designed to:
  select from the graphs database 131 at least one graph whose degree of similarity with the obtained graph exceeds a predetermined level, wherein the graphs database keeps previously formed graphs of the activity of the computer system, each of which is assigned a coefficient of malicious activity on the basis of an analysis of that activity;
  send the selected graph to the analysis module 140.

In one variant aspect of the system, the graphs database 131 is filled up in advance with graphs formed on the basis of objects 111 selected from the computer systems and having known malicious activity. These graphs are formed with the use of the above-described collection module 110 and the graph forming module 120.

In yet another variant aspect of the system, the graphs database 131 is filled up with graphs formed on the basis of objects 111 selected from the computer systems making up the teaching sample used for the machine learning of the selection model 112.

In yet another variant aspect of the system, the graphs database 131 stores the convolutions, and not the actual graphs formed by the above-described methods. The search module 130 in addition calculates the convolution for the graph obtained from the graph forming module 120, and the search in the graphs database 131 is done by comparing the convolution of the calculated convolution of the graph to the convolutions of graphs kept in the database.

In yet another variant aspect of the system, a flexible hash (fuzzy hash) is used as the convolution of the graph.

In yet another variant aspect of the system, the degree of isomorphism of the graphs is determined and on this basis the degree of similarity of those graphs is determined.

The analysis module 140 is designed to pronounce a decision 141 on the detecting of malicious activity in the computer system on the basis of the results of the analysis of the graphs obtained from the graph forming module 120 and the search module 130.

In one variant aspect of the system, the decision on the detecting of malicious activity in the computer system is pronounced on the basis of an analysis of the coefficient of harmfulness of at least one graph found in the graphs database, and the degree of similarity of that graph to the graph formed.

For example, the summary degree of harmfulness of the computer system being analyzed may be calculated by the formula $$w = \prod_{i=1}^{N}\left(1 - \prod_{j=1}^{M}(1 - c_{\{i,j\}} \times w_j)\right)$$

where w is the coefficient of harmfulness of the computer system being analyzed, $w_j$ is the coefficient of harmfulness of the j-th graph selected from the graphs database 131, $c_{\{i,j\}}$ is the degree of similarity of the i-th graph formed and the j-th graph selected from the graphs database 131, N is the number of graphs formed for the computer system being analyzed, M is the number of graphs selected from the graphs database 131.

In yet another example, the coefficient of harmfulness w of the computer system being analyzed may be present in the range from 0.0 (no malicious activity in the computer system) to 1.0 (there was malicious activity in the computer system). If the mentioned coefficient of harmfulness $w_m$ exceeds a predetermined value (such as 0.75), the decision is pronounced that malicious activity has been detected in the computer system being analyzed.

Figure 4:
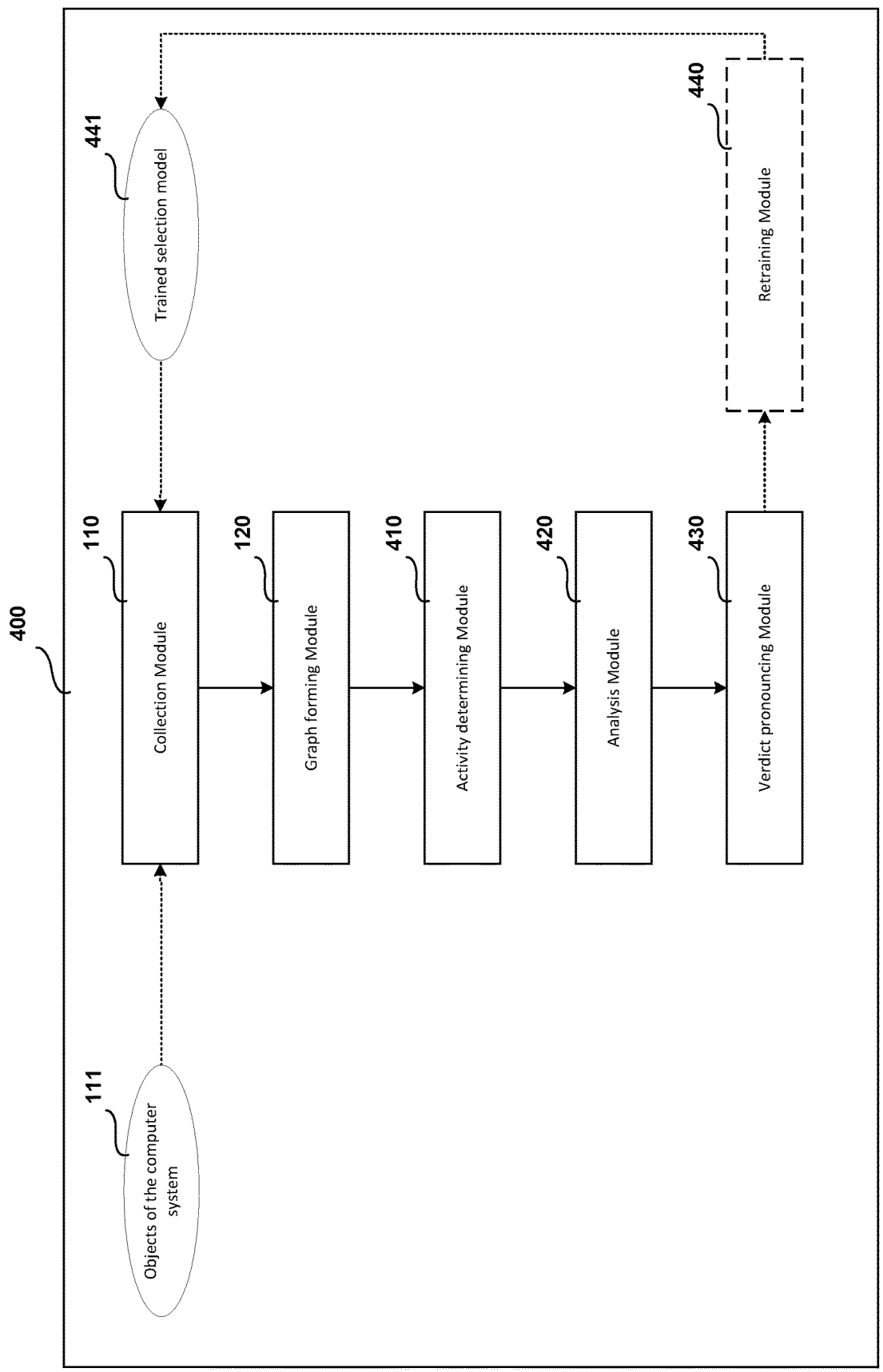
FIG. 4 illustrates another aspect of the system of detecting a source of malicious activity in a computer system in accordance with exemplary aspects of the present disclosure.
Figure 5:
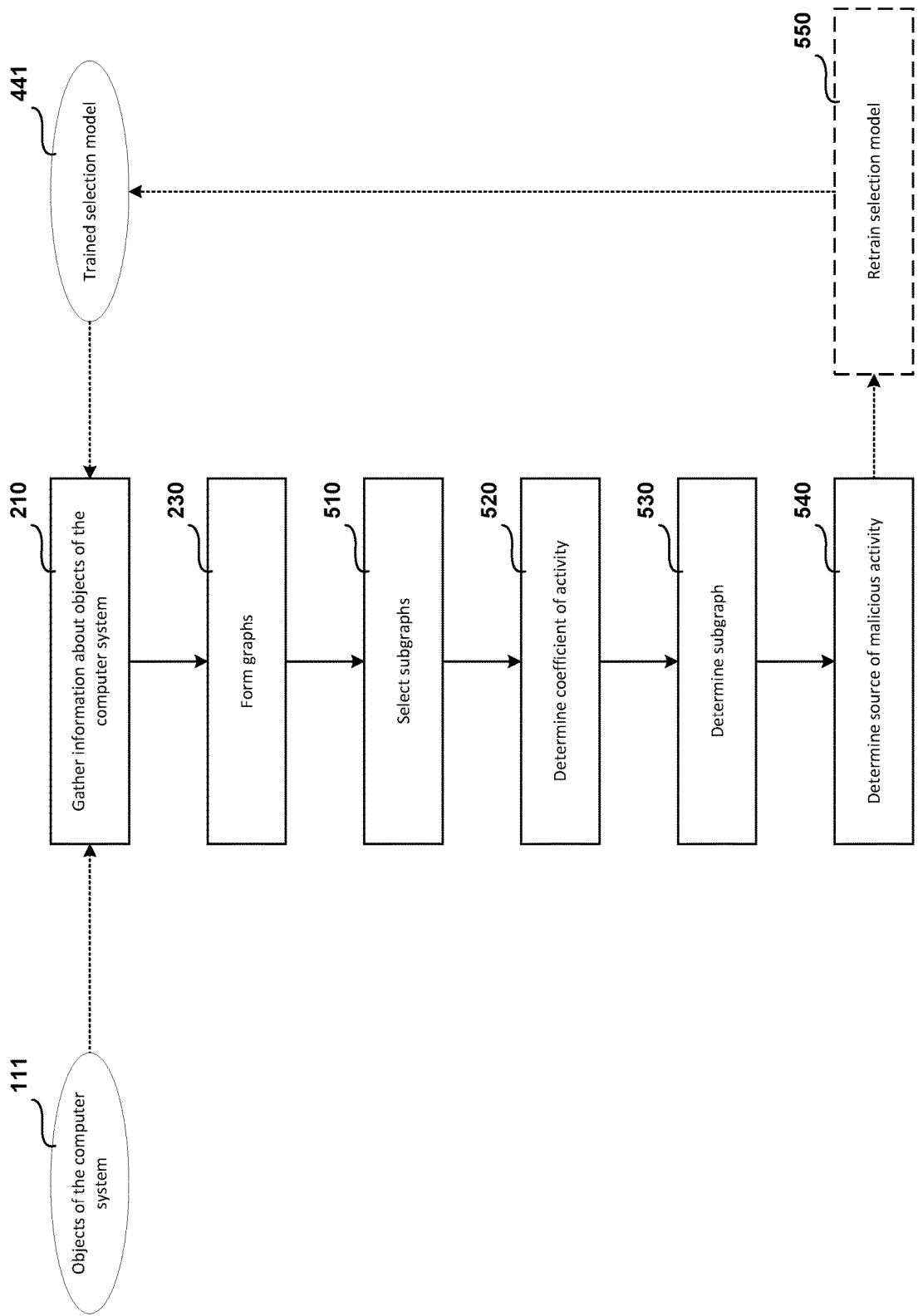
FIG. 5 illustrates a flow diagram of the method of detecting a source of malicious activity in a computer system in accordance with exemplary aspects of the present disclosure.

In yet another variant aspect of the system, the object 111 which is the source of the malicious activity in the computer system is determined on the basis of an analysis of the graph formed (see FIG. 4, FIG. 5).

In one aspect, the retraining module 150 may retrain the selection model 112 on the basis of the decision 141 pronounced by the analysis module 140, such that upon repeat analysis of the same computer system for harmfulness, during the forming of the graphs by the graph forming module 120 on the basis of an analysis of the objects 111 selected by the collection module 110, at least:

the number of selectable objects 111 tends to a minimum, and the decision pronounced in this case by the analysis module 140 on the basis of an analysis of information about those objects 111 and the relations between them tends to a maximum accurate decision, i.e., it tends to a reduced probability of occurrence of errors of the first and second kind (which in turn can be evaluated on a large statistical sample and accomplished by the use of techniques previously used and leading to the required result, said selection and said evaluation in turn being done on the basis of a statistical sample);

the utilization of computing resources for the forming of the graphs by the graph forming module 120 is less than when using objects 111 selected during the use of the non-retrained model.

Let us consider the working of the system of detecting malicious activity in a computer system by the following example:

The user has performed the following actions in series:
signed on to a remote computer by entering a password, created a new service;
which in turn was the reason for the following changes in that computer system:
the creation of the service modifies the registry, the service launches Powershell,
Powershell creates a file.

The collection module 110 gathers information on the objects of the computer system 111:
object #1—entry in log,
object #2—entry in log,
object #3—key in registry,
object #4—entry in log,
object #5—creation of files in the file system.

The graph forming module 120 on the basis of the gathered objects 111 constructs the relations on the basis of the following data:
object #1 (entry in log)→[relation by user name]→...... →object #2 (entry in log)→[relation by service name]→...... →object #3 (key in registry)→[relation by file name in registry key]→...... →object #4 (entry in log)→[relation by file name in log]→...... →object #5 (creation of files in the file system)

Figure 2:
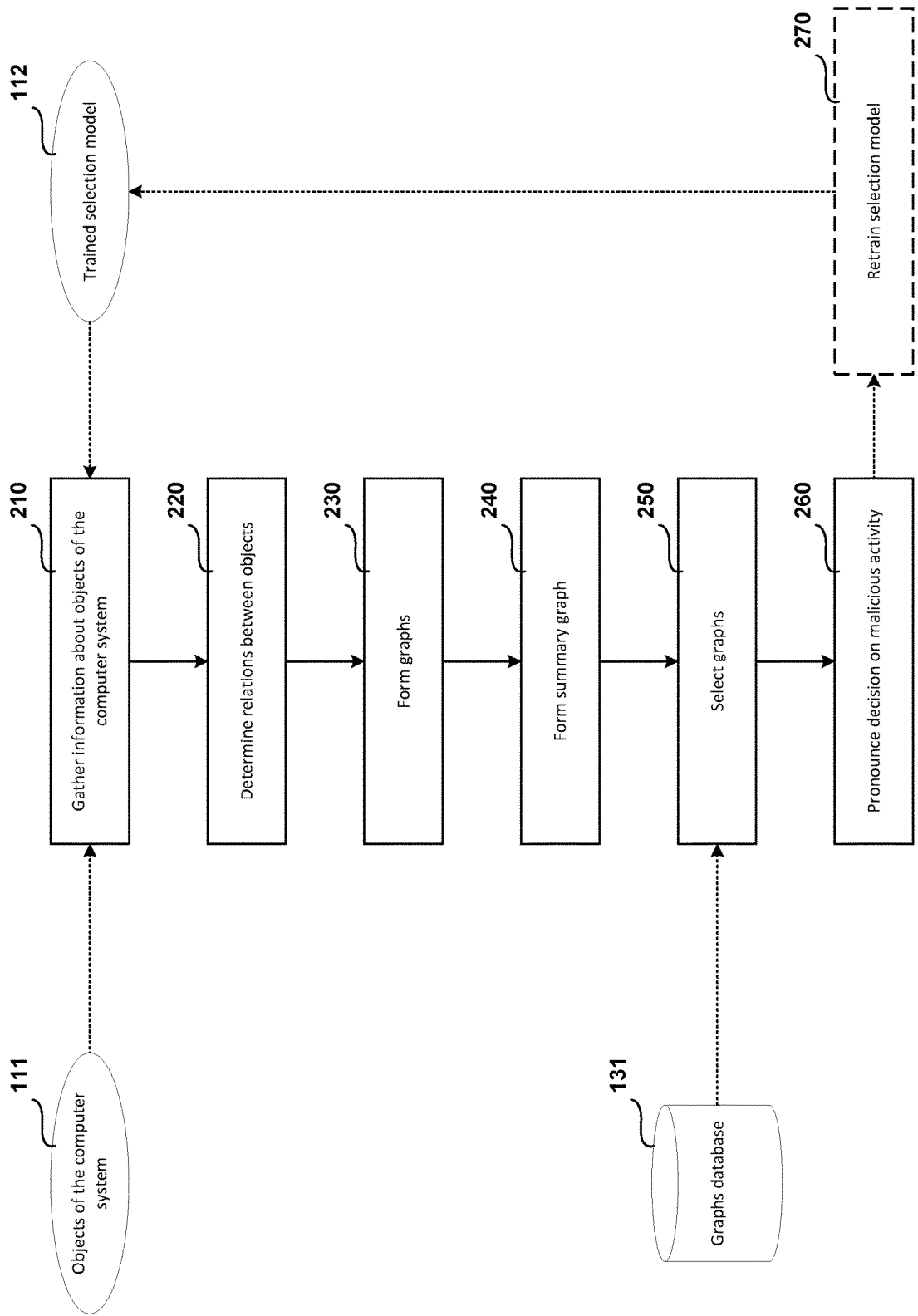
FIG. 2 illustrates a flow diagram of a method of detecting malicious activity in a computer system in accordance with exemplary aspects of the present disclosure.

FIG. 2 illustrates a flow diagram of the method of detecting malicious activity in a computer system in accordance with exemplary aspects of the present disclosure.

The flow diagram of the method of detecting malicious activity in a computer system contains step 210, in which information is gathered about the objects of the computer system, step 220, in which the relations between the objects are determined, step 230, in which graphs are formed, step 240, in which a summary graph is formed, step 250, in which graphs are selected, step 260, in which a decision on the malicious activity is pronounced, and step 270, in which the selection model is retrained.

In step 210, information is gathered about the objects of the computer system 111.

In a particular aspect of the method, the selection of the objects 111 for which information is gathered is done with the use of a trained selection model 112.

In step 220, the relations between objects 111 are determined on the basis of an analysis of the gathered information, each relation being assigned a degree of reliability of the relation.

In one particular aspect of the method, the objects 111 whose degree of reliability of the relation between them is below a predetermined threshold value are eliminated from further analysis of the computer system for malicious activity (i.e., the objects 111 are essentially removed from the graph and not used in the further analysis).

Thus, one achieves a reduction in the computing resources used for the analysis of the computer system for harmfulness.

In step 230, at least two graphs are formed on the basis of the relations found (including the use of the established degree of reliability of the relation), such that the diameter of the graph is less than a predetermined parameter, where the vertices of the graph are the objects 111, and the edges are the relations found.

In step 240, a summary graph is formed on the basis of the graphs formed, such that the summary graph contains at least one vertex from the first and second graph and one edge joining those vertices.

In step 250, at least one graph is selected from the graphs database 131 whose degree of similarity to the summary graph formed is greater than a predetermined level, where the graphs database keeps previously formed graphs of the activity of the computer system, each of which is assigned a coefficient of malicious activity on the basis of an analysis of that activity.

In one variant aspect of the method, the assigning of the coefficients of malicious activity is done by any method known from the prior art, including on the basis of an analysis of that graph by an analyst.

In step 260, a decision on the detecting of malicious activity in the computer system is pronounced on the basis of the results of the analysis of the formed graph and the selected graph.

In step 270, the selection model 112 is retrained on the basis of the decision 141 pronounced in step 260, so that upon repeat analysis of the same computer system for harmfulness, during the forming of the graphs in step 230 on the basis of an analysis of the objects 111 selected in step 210, at least:
 the number of selectable objects 111 tends to a minimum, and the decision pronounced in this case in step 260 on the basis of an analysis of information about those objects 111 and the relations between them tends to a maximum accurate decision;
 the utilization of computing resources for the forming of the graphs in step 230 is less than when using objects 111 selected during the use of the non-retrained model.

Figure 3:
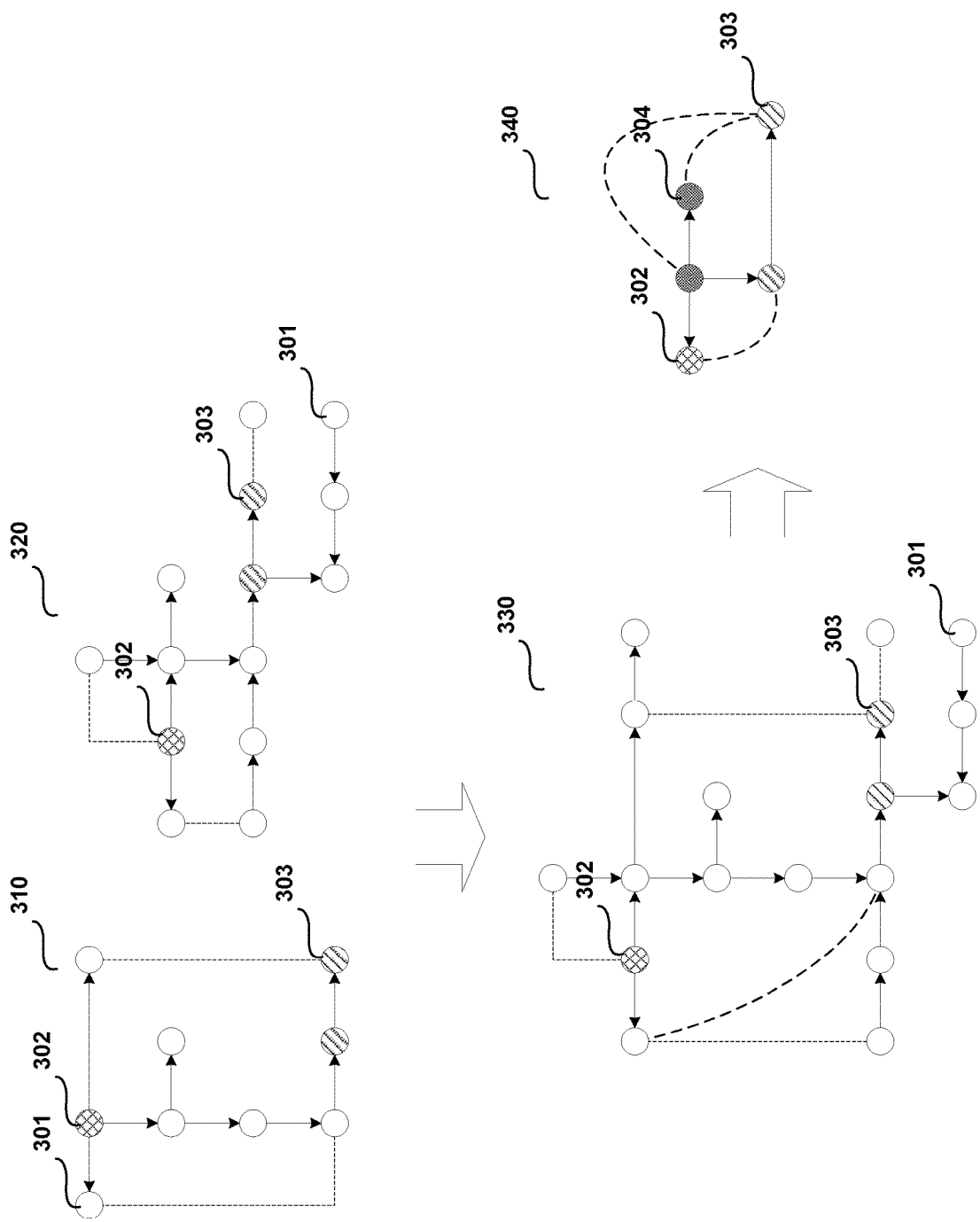
FIG. 3 illustrates a flow diagram for forming a graph on the basis of an analysis of the relations among the objects of a computer system in accordance with exemplary aspects of the present disclosure.

FIG. 3 illustrates a flow diagram for forming a graph on the basis of an analysis of the relations among the objects of a computer system in accordance with exemplary aspects of the present disclosure.

The diagram for forming a graph on the basis of an analysis of the relations among the objects of a computer system 111 contains the initial graphs formed 310 and 320, the combined graph 330, and the optimized graph 340, where for each graph the vertices of the graphs are the objects of the computer system 301, 302, 303.

The objects 301 may be considered to be different objects (for convenience, they are all designated by the same index, being essentially different), while the objects 302 and 303 are the same.

The initial graphs 310 and 320 are formed on the basis of an analysis of the gathered objects 301, 302, 303 and the relations identified between them.

In FIG. 3, the solid lines denote the functional relations between the objects 111, the dotted lines denote logical relations, and the arrows show linking and linked objects (i.e., the arrow starts from the object 111 inducing the relation and goes to the object 111 which is related to that object 111). For example, if a file "report.docx" is extracted from a certain archive "data.zip" containing files "report.docx", "report_old.docx", "report_new.docx", the arrow will indicate a functional relation from the archive "data.zip" to the extracted file "report.docx".

For example, the collection module 110 is used to gather information about the objects of the computer system 111, where the computer system may consist of several independent components (for example, a client and a server), and the mentioned objects 111 gathered from the different independent components may also be viewed as being independent. Thus, several initial graphs will be formed.

In yet another example, the computer system is a unitary one (containing only one independent component), and therefore all the gathered objects 111 may be viewed as being dependent; nonetheless, they may also be divided into several relatively independent groups (with a small number of relations), for which several initial graphs (one for each group) will be constructed.

For example, a malicious program is running in the computer system, making possible a remote control of said computer system (backdoor), which may consist of several independent modules (for example, modules working with the disk system, with databases, with memory, with electronic documents, and so forth); receiving commands from a "master", that malicious program may carry out certain malicious or unauthorized actions. In one particular instance, when the malicious program has received two different commands: "encrypt documents" and "get passwords". The two actions will be independent and may be implemented by different modules of the malicious program. In the analysis of such a computer system, 2 independent graphs will be constructed, in one of which for the most part the objects 111 will be files (documents), while in the other one they will be entries in the operating system logs. Even so, the relation between the two graphs can be tracked by the network activity (which is likewise reflected in the operating system logs), the source of activity (the modules of the malicious program), the time of starting of the activity, the network packets, and so forth.

The graph forming module 120 forms the initial graphs 310, 320 such that these contain (as vertices) at least two identical or similar objects 111 (similar objects are objects differing from each other in at least one parameter by an amount not greater than a specified amount). For example, the initial graph 310 contains two identical objects 303.

A combined graph 330 is formed on the basis of the previously formed initial graphs 310 and 320.

The graph forming module 120 forms the combined graph 330 such that it includes all identical or similar objects 111 present in all the initial graphs on whose basis the combined graph 330 is formed. For example, the combined graph 330 contains all the objects 302, 303 present in the initial graphs 310, 320.

The combined graph 330 may be viewed as a summary graph, on the basis of which the search module 130 will perform the following analysis of that graph. Even so, for the system of detecting malicious activity in a computer system to be less demanding of computer resources (space in the graphs database, computing resources to form, search for, and analyze graphs, and so on), the graph forming module 120 performs an optimization of the combined graph 330 and forms the optimized graph 340.

The optimized graph 340 is formed on the basis of the previously formed combined graph 330.

The graph forming module 120 forms the optimized graph 340 such that it includes all the identical or similar objects 111 present in all the initial graphs, and in the combined graph. For example, the optimized graph 340 contains all the objects 302, 303 present in the initial graphs 310, 320 and the combined graph 330.

Yet all the objects and relations (vertices and edges) not related to those objects 111 can be removed from the optimized graph 340 (indicated as clear circles 301).

Thus, after optimization in addition to the mentioned objects 302, 303 there may be found objects 304 between which a relation is established that was not previously found in the step of forming the initial graphs 310, 320.

The optimized graph 340 is already more compact than the combined graph 330, and therefore further work with the use of the optimized graph is more optimal.

FIG. 4 illustrates a block diagram of the system 400 of detecting a source of malicious activity in a computer system in accordance with exemplary aspects of the present disclosure.

The block diagram of the system 400 of detecting a source of malicious activity in a computer system contains the collection module 110, the graph forming module 120, an activity determining module 410, an analysis module 420, and an verdict pronouncing module 430.

The activity determining module 410 is designed to:
determine the coefficient of activity for each selected subgraph, where the coefficient of harmfulness represents a numerical characteristic describing the strength of graph between the vertices of said subgraph;
send the selected subgraphs and coefficients of harmfulness to the analysis module 420.

In one variant aspect of the system, the coefficient of harmfulness of the subgraph is determined on the basis of the degree of similarity of that subgraph with at least one subgraph from the graphs database containing previously formed graphs of malicious activity of the computer system, each of which is assigned a coefficient of harmfulness.

In this case, the subgraph or induced subgraph of a graph is another graph formed from the subset of the vertices of the graph together with all the edges joining pairs of vertices from this subset.

In yet another variant aspect of the system, the coefficient of activity of the subgraph is a coefficient of harmfulness characterizing the likelihood that at least one object of those associated with the vertices of that subgraph is malicious.

In one aspect, the analysis module 420 may:
determine the subgraph for which:
the coefficient of harmfulness is the minimum of the coefficients of harmfulness determined for the subgraphs,
the summary coefficient of harmfulness of the subgraphs (i.e., the sum total of the coefficients of harmfulness of the subgraphs or the measure of the central tendency of the coefficients of harmfulness of the subgraphs) related to that subgraph is a maximum;
send the subgraph found to the verdict pronouncing module 430.

In one variant aspect of the system, the analysis module 420 analyzes the subgraphs related to other subgraphs by edges corresponding to a causal relation, i.e., edges corresponding to a logical, and not a functional relation.

In yet another variant aspect of the system, the analysis module 420 analyzes the subgraphs whose diameters are less than a predetermined threshold value.

The verdict pronouncing module 430 is designed to determine the object 111 associated with at least one vertex of the subgraph found as the source of malicious activity in the computer system.

In one variant aspect of the system, the verdict pronouncing module 430 selects previously unknown objects 111 as the source of malicious activity.

FIG. 5 illustrates a flow diagram of the method of detecting a source of malicious activity in a computer system in accordance with exemplary aspects of the present disclosure.

The structural diagram of the method of detecting a source of malicious activity in a computer system contains the step 210, in which information is gathered about the objects of the computer system 111 (shown in FIG. 2), step 230, in which graphs are formed (shown in FIG. 2), step 510, in which subgraphs are selected, step 520, in which the coefficient of harmfulness is determined, step 530, in which a subgraph is determined, and step 540, in which the source of malicious activity is determined.

In step 210, information is gathered about the objects of the computer system 111 (hereinafter, "objects") with the aid of the collection module 110.

In step 230 the graph forming module 120 is used to form a graph on the basis of the information gathered about the objects 111, where the vertices of the graph are the objects 111, and the edges are the relations between objects determined on the basis of an analysis of the information gathered.

In step 510, the activity determining module 410 is used to select at least two induced subgraphs (hereafter, subgraph) from the graph so formed.

In step 520, the activity determining module 410 is used to determine the coefficient of harmfulness for each selected subgraph, the coefficient of harmfulness being a numerical characteristic describing the strength of the relations between the vertices of that subgraph.

In step 530, the analysis module 420 is used to determine the subgraph for which:
the coefficient of harmfulness is the minimum of the coefficients of harmfulness determined for the subgraphs,
the summary coefficient of harmfulness of the subgraphs related to that subgraph is a maximum.

In step 540, the verdict pronouncing module 430 is used to determine the object associated with at least one vertex of the subgraph determined as the source of the malicious activity in the computer system.

Figure 6:
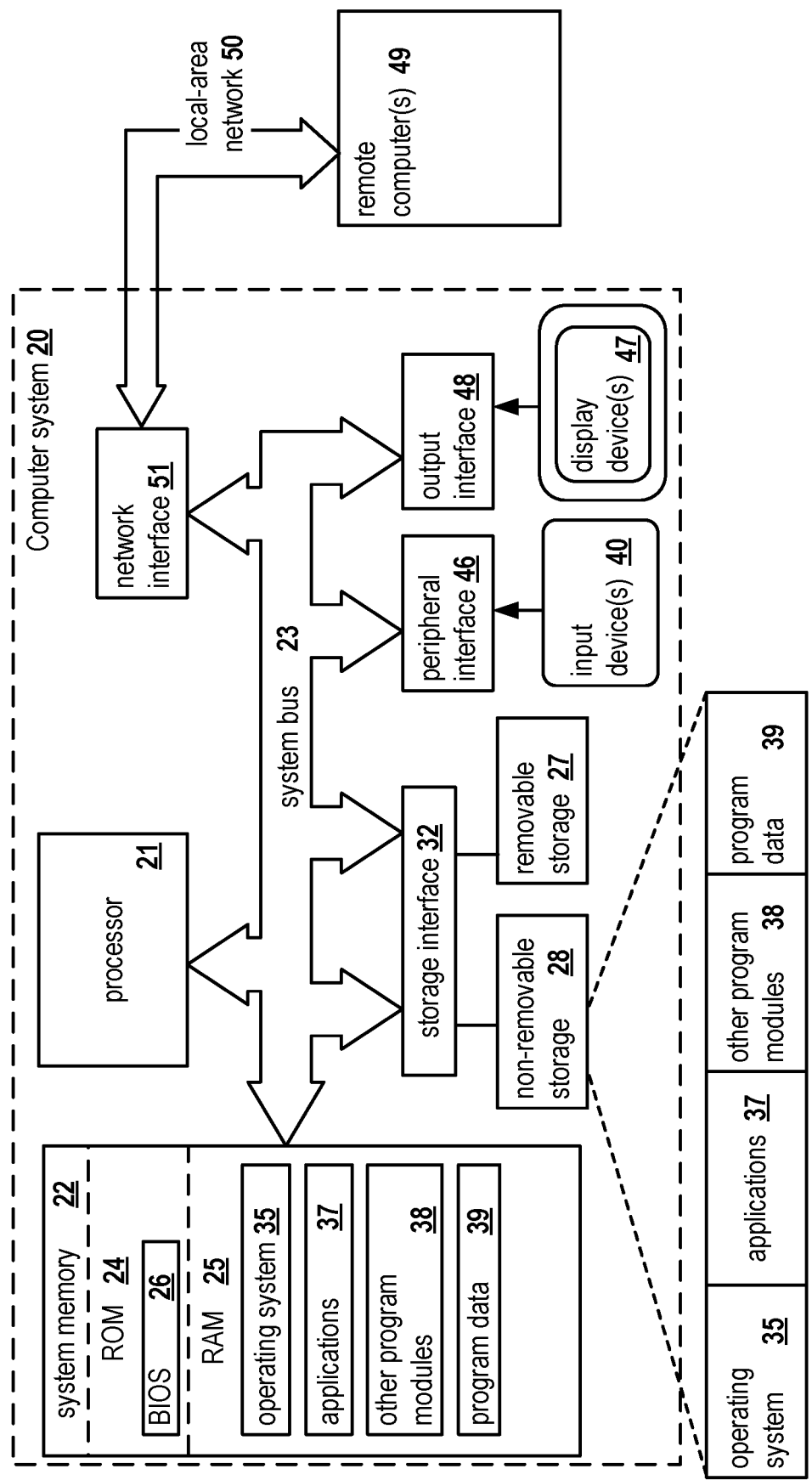
FIG. 6 is a block diagram general-purpose computer system, a personal computer or a server in accordance with exemplary aspects of the present disclosure.

FIG. 6 is a block diagram illustrating a computer system 20 on which aspects of systems and methods for detecting a source of malicious activity in a computer system may be implemented in accordance with an exemplary aspect. It should be noted that the computer system 20 can correspond to system 100 for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof.

The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for detecting a source of malicious activity in a computer system, comprising:
   gathering, by a hardware processor, information related to the objects of the computer system;
   determining, by the hardware processor, one or more relations between the objects based on an analysis of the gathered information;
   forming, by the hardware processor, a graph based on the information gathered on the objects and based on an assigned degree of reliability of a relation between two objects, where the objects appear as vertices of the graph, and relations between the objects appear as edges of the graph, wherein the degree of reliability of a relation between a first object and a second object is a numerical value characterizing probability that the first object has a logical or functional relation to the second object and wherein the formed graph is optimized to reduce number of the relations between the objects by eliminating at least one of: one or more edges with predetermined properties and one or more duplicate edges;
   selecting, by the hardware processor, at least two induced subgraphs from the resulting graph;
   determining, by the hardware processor, coefficient of harmfulness for each selected subgraph, the coefficient of harmfulness representing a numerical characteristic describing strength of the relations between the vertices of that subgraph;
   determining, by the hardware processor, from the selected subgraphs, a subgraph whose coefficient of harmfulness is a minimum among the determined coefficients of harmfulness of the subgraphs, and total coefficient of harmfulness of the subgraphs related to that subgraph is a maximum; and
   identifying, by the hardware processor, object correlated with at least one vertex of the determined subgraph as a source of the malicious activity in the computer system.

2. The method of claim 1, further comprising:
   determining, by the hardware processor, the coefficient of harmfulness of the subgraph based on a degree of similarity of that subgraph with at least one subgraph from a database of
   graphs containing previously formed graphs of malicious activity of the computer system, each of which is associated with a coefficient of harmfulness.

3. The method of claim 1, wherein the coefficient of harmfulness of a subgraph is a coefficient of harmfulness characterizing probability that at least one object of those associated with the vertices of the mentioned subgraph is malicious.

4. The method of claim 1, wherein only subgraphs related to other subgraphs by graph edges associated with a cause and effect relationship are analyzed.

5. The method of claim 1, wherein subgraphs whose diameters are less than a predetermined threshold value are analyzed.

6. The method of claim 1, wherein previously unknown objects are selected from the objects found as being the source of the malicious activity.

7. The method of claim 1, wherein the objects comprise at least one of files, folders, applications, registry entries, or web sites.

8. A system for detecting a source of malicious activity in a computer system, comprising:
   a hardware processor configured to:
   gather information related to the objects of the computer system;
   determine one or more relations between the objects based on an analysis of the gathered information;
   form a graph based on the information gathered on the objects and based on an assigned degree of reliability of a relation between two objects, where the objects appear as vertices of the graph, and relations between the objects appear as edges of the graph, wherein the degree of reliability of a relation between a first object and a second object is a numerical value characterizing probability that the first object has a logical or functional relation to the second object and wherein the formed graph is optimized to reduce number of the relations between the objects by eliminating at least one of: one or more edges with predetermined properties and one or more duplicate edges;
   select at least two induced subgraphs from the resulting graph;
   determine coefficient of harmfulness for each selected subgraph, the coefficient of harmfulness representing a numerical characteristic describing strength of the relations between the vertices of that subgraph;

determine, from the selected subgraphs, a subgraph whose coefficient of harmfulness is a minimum among the determined coefficients of harmfulness of the subgraphs, and total coefficient of harmfulness of the subgraphs related to that subgraph is a maximum; and identify object correlated with at least one vertex of the determined subgraph as a source of the malicious activity in the computer system.

9. The system of claim 8, further comprising:
determining the coefficient of harmfulness of the subgraph based on a degree of similarity of that subgraph with at least one subgraph from a database of graphs containing previously formed graphs of malicious activity of the computer system, each of which is associated with a coefficient of harmfulness.

10. The system of claim 8, wherein the coefficient of harmfulness of a subgraph is a coefficient of harmfulness characterizing probability that at least one object of those associated with the vertices of the mentioned subgraph is malicious.

11. The system of claim 8, wherein only subgraphs related to other subgraphs by graph edges associated with a cause and effect relationship are analyzed.

12. The system of claim 8, wherein subgraphs whose diameters are less than a predetermined threshold value are analyzed.

13. The system of claim 8, wherein previously unknown objects are selected from the objects found as being the source of the malicious activity.

14. The system of claim 8, wherein the objects comprise at least one of files, folders, applications, registry entries, or web sites.

15. A non-transitory computer-readable medium, storing instructions thereon for detecting a source of malicious activity in a computer system, the instructions comprising:
gathering information related to the objects of the computer system;
determining one or more relations between the objects based on an analysis of the gathered information
forming a graph based on the information gathered on the objects and based on an assigned degree of reliability of a relation between two objects, where the objects appear as vertices of the graph, and relations between the objects appear as edges of the graph, wherein the degree of reliability of a relation between a first object and a second object is a numerical value characterizing probability that the first object has a logical or functional relation to the second object and wherein the formed graph is optimized to reduce number of the relations between the objects by eliminating at least one of: one or more edges with predetermined properties, and one or more duplicate edges;
selecting at least two induced subgraphs from the resulting graph;
determining coefficient of harmfulness for each selected subgraph, the coefficient of harmfulness representing a numerical characteristic describing strength of the relations between the vertices of that subgraph;
determining, from the selected subgraphs, a subgraph whose coefficient of harmfulness is a minimum among the determined coefficients of harmfulness of the subgraphs, and total coefficient of harmfulness of the subgraphs related to that subgraph is a maximum; and
identifying object correlated with at least one vertex of the determined subgraph as a source of the malicious activity in the computer system.

16. The medium of claim 15, the instructions further comprising:
determining the coefficient of harmfulness of the subgraph based on a degree of similarity of that subgraph with at least one subgraph from a database of graphs containing previously formed graphs of malicious activity of the computer system, each of which is associated with a coefficient of harmfulness.

17. The medium of claim 15, wherein the coefficient of harmfulness of a subgraph is a coefficient of harmfulness characterizing probability that at least one object of those associated with the vertices of the mentioned subgraph is malicious.

18. The medium of claim 15, wherein only subgraphs related to other subgraphs by graph edges associated with a cause and effect relationship are analyzed.

19. The medium of claim 15, wherein subgraphs whose diameters are less than a predetermined threshold value are analyzed.

20. The medium of claim 15, wherein previously unknown objects are selected from the objects found as being the source of the malicious activity.

* * * * *